UNITED STATES PATENT OFFICE.

JOHN McCULLOCH, OF SAN FRANCISCO, CALIFORNIA.

IMPROVED PROCESS FOR TREATING ORES OF GOLD, SILVER, AND COPPER.

Specification forming part of Letters Patent No. 28,882, dated June 26, 1860.

*To all whom it may concern:*

Be it known that I, JOHN MCCULLOCH, of San Francisco, in the county of San Francisco, in the State of California, have invented a new and Improved Mode of Reducing and Liberating the Metals Gold, Silver, and Copper from their Ores; and I do hereby declare that the following is a full and exact description of the same.

The object of this invention is to operate upon the ores containing gold, silver, and copper, or mixtures of these ores and metals, in a more simple and economical manner than heretofore, for the purpose of obtaining the metal or metals therefrom in a metallic or reduced state. To this end I first reduce the ore to powder by stampers or other suitable means, and, if need be, I concentrate the metalliferous ingredients G separating the constituent earthy compounds from the metallic compounds by washing and subsidence. With the ore so prepared I intimately mix powdered charcoal, either animal or vegetable, or any suitable substance containing carbon—such as oils and fats—and I add thereto, if necessary, any refuse vegetable matter, such as sawdust, dried leaves or grasses, chopped straw, or the excrementitions of herbivorous animals; and this mixture I mold into such forms as will best admit of the application of fire heat thereto for the reduction or recovery of the metal or metals contained therein; but in order to give a sufficient amount of consistency and resistant strength to the molded blocks or masses to allow of their being stacked in kilns, clamps, ovens, or furnaces, and insure their retaining their shape while being exposed to a high temperature, I work into this mixture a suitable proportion of common clay or other equivalent binding material, preferring clay that has been washed with water and collected by subsidence, as that is both cheap and efficient in its action. These several ingredients to form masses, bricks, blocks, or cakes I work together by the aid of a pug-mill or other suitable means, adding water as may be required to facilitate the working. When the materials are thoroughly mixed I mold them into form either by means of machinery or by hand-molds, and the masses, bricks, blocks, or cakes thus formed I dry previously to subjecting them to artificial heat.

The ores upon which I propose chiefly to operate are auriferous iron and arsenical pyrites, and the sulphides, sulphates, chlorides, carbonates, and oxides of silver and copper. Having reduced, say, one of these ores to powder and worked it into blocks in admixture with the carbonaceous and plastic materials, as above explained, I stack the blocks either in a kiln made after the manner of a brick-kiln, or in a clamp, oven, or furnace, preferring, however, the former, and I then fire them as if I were burning ordinary bricks. When sufficiently burned I allow the contents of the kiln, clamp, oven, or furnace, as the case may be, to cool down. I then remove the burned bricks or blocks and reduce them to powder. The gold and silver, separately or mixed, will be found in a comminuted metallic state scattered through the mass, while the copper may be likewise in a metallic state, or it may be as an oxide, or a mixture of both similarly scattered through the earthy matters of which the crushed blocks were mainly composed, and the same may then be easily separated from the mass by lixiviation or (in the case of gold or silver) by amalgamation with mercury.

The proportions of materials which I have found to yield good results when manufactured into masses, bricks, blocks, or cakes and submitted to kiln, clamp, oven, or furnace burning are ground ore, one hundred parts, by weight; charcoal, twenty-five parts, by weight; sawdust or other vegetable matter, twenty-five parts, by weight; dry clay, fifty parts, by weight.

I have stated that the use of the clay is simply to hold the powdered ore and the other matters enumerated mechanically together both while the molding and the burning of the blocks are being effected; and I may also remark that the carbonaceous matters have also a mechanical use—viz., to render the blocks porous and allow of the oxygen of the air not merely to play around but to enter the blocks while they are under the action of the fire. Thus, for example, when burning blocks containing sulphide of silver the woody and carbonaceous matter mixed therewith will, by its partial combustion, render the blocks porous, and thus afford a means for the oxygen of the air to penetrate through every part of the blocks, where, meeting with the sulphur liberated from the ore by the action of the furnace-heat, it will form sulphurous acid, and thus carry off the sulphur in a gaseous form, leaving the silver in a metallic state imprisoned in the blocks.

As another example of the use of the charcoal and carbonaceous matter, I will instance the action, when combined in a block according to my invention, with an ore of carbonate of copper. The combustion of the woody matter and charcoal in this case not only renders the block porous, whereby the carbonic acid of the ore set free by the heat is allowed to escape, leaving the metal as oxide of copper; but the carbon still present in the block, by commixture with the ground ore, to a great extent takes up the oxygen from the oxides of copper, leaving such portions of the copper in a metallic state.

It will thus be seen that the carbonaceous matters, as applied by my invention for the liberation of gold and the reduction and separation of silver and copper from their ores, have a materially different and far more efficient action than when simply applied in the manner commonly practiced in the reduction of metals; and, further, it will be understood that, as the clay acts merely as a medium for holding the comminuted particles together, other substances possessing the same property may doubtless be substituted for that material. I do not therefore claim the use of carbonaceous matters for the separation of gold and the reduction of silver and copper from their ores irrespective of the means of applying such carbonaceous matters; neither do I confine myself to the use of the ingredients above mentioned for composing the blocks; but what I do claim is subjecting the ores of gold, silver, and copper to kiln, clamp, oven, or furnace burning when molded or wrought into blocks, bricks, or cakes or masses, as above described.

What I claim as my invention, and desire to secure by Letters Patent, is—

The mode of reducing and liberating the metals gold, silver, and copper from their ores, together or separately, by mixing with any one or more of the said ores in a very finely-powdered or comminuted state, and when intimately mixed with ground charcoal or other carbonaceous matters, a certain proportion of plastic material, as common brick-clay, china-clay, or any other natural or compounded materials that will agglutinate only at temperatures under a white heat, forming the metalliferous and carbonaceous mixture so compounded with plastic material into masses, bricks, blocks, or cakes, and then submitting the whole to artificial heat, which is continued while the earthy frame-work, which forms a porous matrix commanding a great extent of internal as well as external surface, holds and exposes the metallic ores or compounds, and also the carbonaceous matters to the decomposing action of atmospheric air, oxygen, carbon, and heat in a kiln, clamp, oven, or furnace. The reduced metallic constituents may then be collected by pulverization, washing in water and subsidence therefrom, by melting and fluxing, or by amalgamation, as may be most convenient.

JOHN McCULLOCH.

Witnesses:
 JOHN SCOTT,
 ADAM YOUNG,
 F. S. MYER.